United States Patent
Park et al.

(10) Patent No.: US 7,927,750 B2
(45) Date of Patent: Apr. 19, 2011

(54) MICRO CHANNEL HEATER FOR EVEN HEATING

(75) Inventors: Jong-Soo Park, Daejeon (KR); Wang-Lai Yoon, Daejeon (KR); Ho-Tae Lee, Daejeon (KR); Heon Jung, Daejeon (KR); Sung-Ho Cho, Daejeon (KR); Shin-Kun Lee, Daejeon (KR); Kun-Hoo Lee, Seoul (KR); Seung-Hoon Choi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 1039 days.

(21) Appl. No.: 11/576,156

(22) PCT Filed: Oct. 11, 2005

(86) PCT No.: PCT/KR2005/003384
§ 371 (c)(1),
(2), (4) Date: Mar. 28, 2007

(87) PCT Pub. No.: WO2006/085715
PCT Pub. Date: Aug. 17, 2006

(65) Prior Publication Data
US 2008/0050634 A1 Feb. 28, 2008

(30) Foreign Application Priority Data

Oct. 11, 2004 (KR) .................... 10-2004-0080918

(51) Int. Cl.
*H01M 8/04* (2006.01)
*H01M 8/06* (2006.01)
*H01M 8/18* (2006.01)
*B01J 19/00* (2006.01)

(52) U.S. Cl. ........ 429/433; 429/416; 429/417; 429/434; 422/198

(58) Field of Classification Search ............ 429/26, 429/19, 433, 416, 417, 434, 198; 422/198
See application file for complete search history.

(56) References Cited

U.S. PATENT DOCUMENTS
6,096,286 A * 8/2000 Autenrieth ............. 423/651

FOREIGN PATENT DOCUMENTS
KR 1020020020193 12/2003
* cited by examiner

*Primary Examiner* — Patrick Ryan
*Assistant Examiner* — Julian Mercado
(74) *Attorney, Agent, or Firm* — Bardmesser Law Group

(57) ABSTRACT

A heater has microchannels for uniform heating, and includes an upper plate having an inlet of material to be heated, a fuel inlet and an oxidant inlet. A lower plate has a heated material outlet and an exhaust gas outlet. A plurality of combustion thin plates and a plurality of heat transfer thin plates are alternately layered between the upper and lower plates. Each of the combustion thin plates and the heat transfer thin plates has an inlet hole of material to be heated, a heated material outlet hole, an oxidant hole, an exhaust gas hole, a fuel hole, and microchannels formed at respective corresponding positions. The upper plate is aligned with the combustion thin plate contacting the lower surface thereof, and the lower plate is aligned with the heat transfer thin plate contacting the upper surface thereof.

9 Claims, 3 Drawing Sheets

MICRO CHANNEL HEATER FOR EVEN HEATING

CROSS-REFERENCE TO RELATED APPLICATIONS

The present application is a U.S. National Phase of PCT Application No. PCT/KR2005/003384, filed Oct. 11, 2005, which claims priority to Korean Patent Application No. 10-2004-0080918, filed Oct. 11, 2004, which are both incorporated herein by reference in their entirety.

FIELD OF THE INVENTION

The present invention relates to a heater having microchannels for uniform heating.

BACKGROUND OF THE RELATED ART

With the recent interest in fuel cells, a great deal of research into reactors for uniform heating to create hydrogen from hydrocarbons is being conducted. Hydrogen may be variously prepared using hydrocarbons, as shown in Reactions 1 to 3 below. Of these reactions, a steam reforming reaction shown in Reaction 1 is receiving researchers' attention, because the hydrogen product has a very high concentration. In addition, partial oxidation (Reaction 3) having rapid response properties is also receiving researcher's attention.

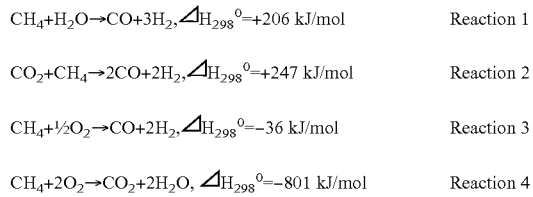

| | |
|---|---|
| $CH_4 + H_2O \rightarrow CO + 3H_2, \Delta H_{298}^0 = +206$ kJ/mol | Reaction 1 |
| $CO_2 + CH_4 \rightarrow 2CO + 2H_2, \Delta H_{298}^0 = +247$ kJ/mol | Reaction 2 |
| $CH_4 + \frac{1}{2}O_2 \rightarrow CO + 2H_2, \Delta H_{298}^0 = -36$ kJ/mol | Reaction 3 |
| $CH_4 + 2O_2 \rightarrow CO_2 + 2H_2O, \Delta H_{298}^0 = -801$ kJ/mol | Reaction 4 |

As a hydrogen preparation system for a small stationary fuel cell Residential Power Generator (RPG), the steam reforming reaction, which results in a high hydrogen concentration, is expected to have more usefulness than the rapid response reaction, and thus has been intensively and thoroughly studied.

However, the reaction, which is apparent from Reaction 1, has a problem because heat required for the above reaction must be supplied. In the steam reforming reaction, when the reaction temperature is at least 750° C., the conversion efficiency of hydrocarbon (methane) can reach 95% or more. However, much effort is required to supply the reaction heat while maintaining high temperatures.

The reaction heat is produced through the combustion (catalytic oxidation or combustion) of hydrocarbon, as shown in Reaction 4. As such, in order to effectively realize heat transfer, there is a need for a material having a high temperature difference ($\Delta T$), a large contact area (A), and a high heat transfer coefficient (k).

However, it is impossible to indefinitely increase the temperature of a flame required for heating to obtain the temperature difference. In this case, the constituent material may become degraded, and nitrogen oxide (NOx) pollutants may be generated. The heat transfer coefficient is also limited to the inherent value of the constituent material.

Thus, the reactor should be structured such that the heat transfer area is as large as possible.

To this end, attempts have been made to use a reactor comprising thin metal plates in which microchannels are formed. A plurality of thin metal plates, each of which is processed to have microchannels, is layered to obtain a large contact area per unit volume (see Korean Patent Laid-open Publication No. 2003-0091280 incorporated herein by reference).

However, since the combustion of hydrocarbon (LNG, LPG, alcohol) necessary for the production of reaction heat is an intense reaction, which produces very large amounts of heat, it may be performed through catalytic combustion or non-catalytic combustion.

In addition, a mixture comprising hydrocarbon and air may be oxidized through spontaneous combustion at a predetermined minimum temperature (e.g., 650° C. in the case of carbon monoxide, which is present in air).

Therefore, even with the use of a reactor having microchannels, if the combustion heat is partially produced at the location where the reaction material is supplied, the temperature of the reactor is non-uniform, thus creating non-uniform combustion catalyst or hot portions, resulting in decreased activity of the reforming catalyst.

SUMMARY OF THE INVENTION

Accordingly, the present invention is related to a microchannel heater substantially obviates one or more of the disadvantages of the related art.

In one aspect, there is provided a heater including an upper plate with an inlet for material to be heated, a fuel inlet and an oxidant inlet. A lower plate includes a heated material outlet and an exhaust gas outlet. A plurality of combustion plates and a plurality of heat transfer plates are alternately layered between the upper plate and the lower plate. Each of the combustion plates and each of the heat transfer plates has an inlet hole of the material to be heated, a heated material outlet hole, an oxidant hole, an exhaust gas hole, and a fuel hole. A first plurality of microchannels connect the exhaust gas hole and the fuel hole of the combustion plate. A second plurality of microchannels connect the inlet hole of material to be heated and the heated material outlet hole of the heat transfer plate. The combustion plate has a fuel supply hole connected to a fuel hole of an adjacent heat transfer plate. The inlet of material to be heated, the fuel inlet, and the oxidant inlet of the upper plate are aligned with the inlet hole of material to be heated, the fuel hole, and the oxidant hole of one of the combustion plates that is in contact with the upper plate. The heated material outlet and the exhaust gas outlet of the lower plate are aligned with the heated material outlet hole and the exhaust gas hole of one of the heat transfer plates that is adjacent to the lower plate. The microchannels of the combustion plates are coated with an oxidation catalyst, such as any of Al, Ti, Si, and Zr. The microchannels of the combustion plates can also be coated with any of Ce, Co, La or Sn. An outer surface of each combustion plate is coated with any of Pt, Pd, Rh, and Ru. The microchannels of the heat transfer plates are coated with a hydrocarbon reforming catalyst that preferably includes a precious metal.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
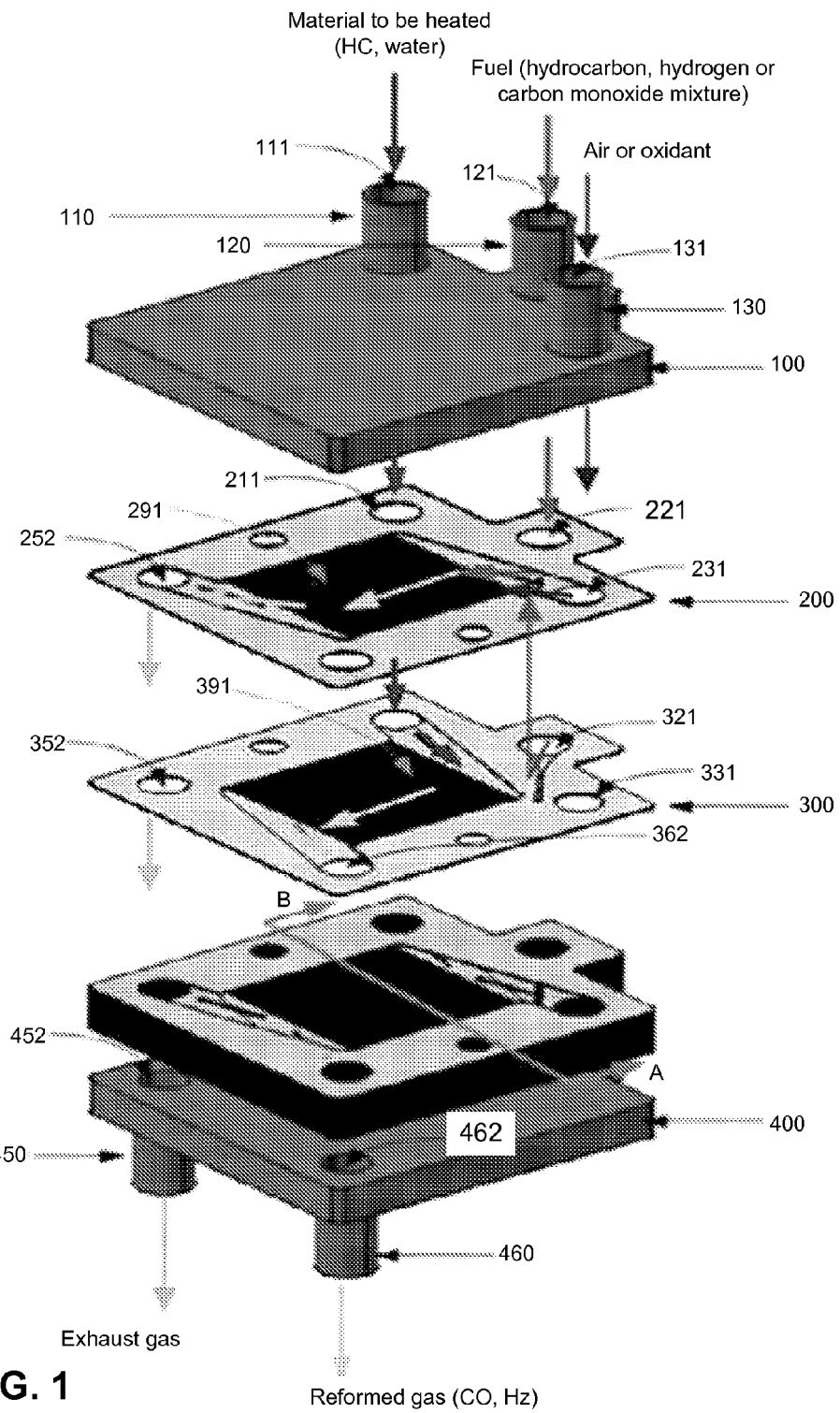
FIG. 1 is an exploded perspective view showing each component of a heater of the present invention.
Figure 2:
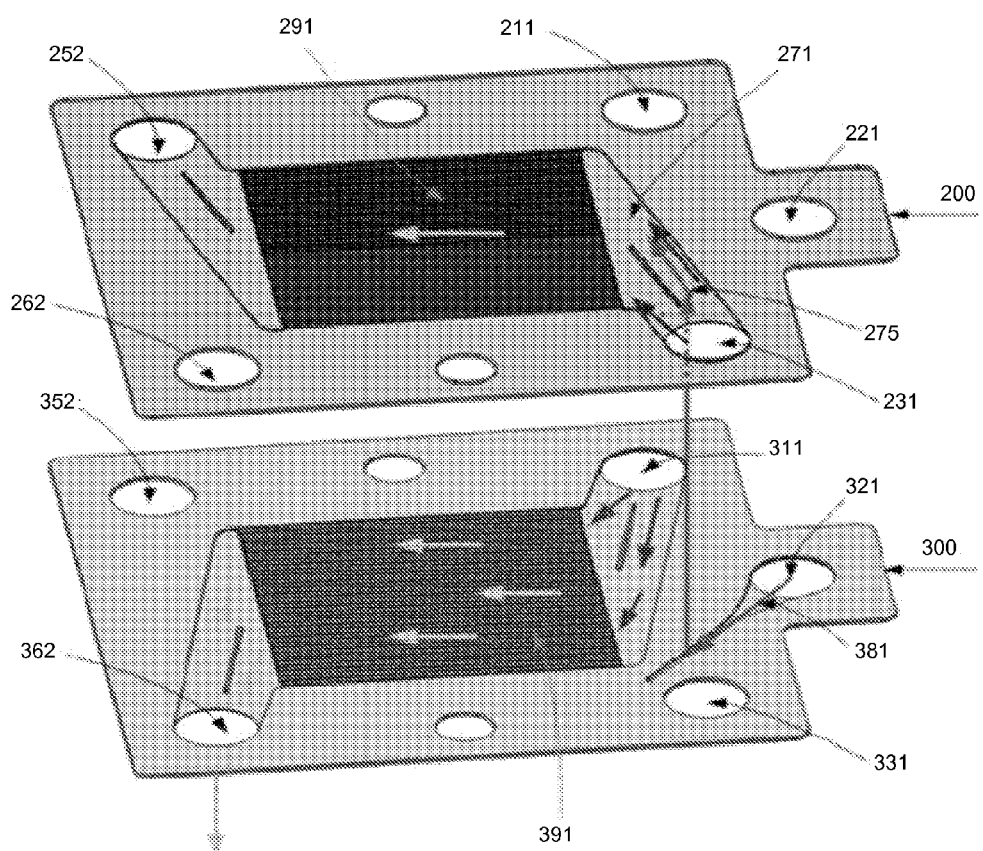
FIG. 2 is a perspective view showing the components of the present invention.
Figure 3:
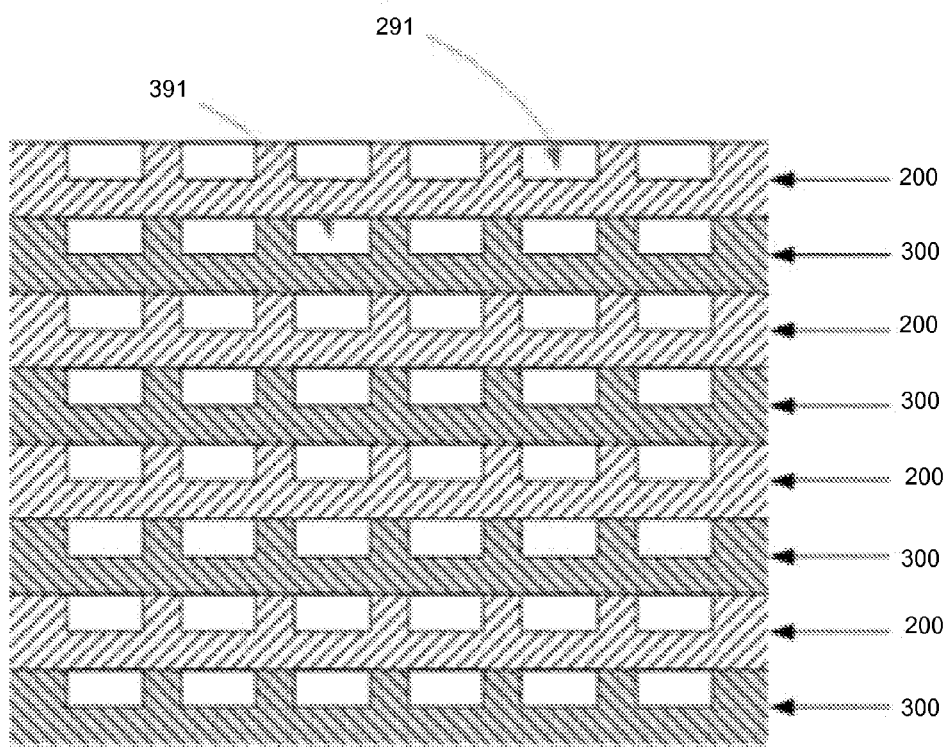
FIG. 3 is an enlarged cross-sectional view showing combustion thin plates and heating thin plates of FIG. 1.

Reference will now be made in detail to the preferred embodiments of the present invention, examples of which are illustrated in the accompanying drawings.

Accordingly, the present invention has been made keeping in mind the above problems of conventional art. An object of the present invention is to provide a heater having microchannels. In such a system, the microchannels are provided to cause a combustion reaction of hydrocarbon, for the production of reaction heat. The reaction can occur at many points in the central portion of a thin plate where reaction materials are present. A mixing portion for mixing hydrocarbon and combustion air is provided at the corresponding thin plate, thus maximally suppressing partial oxidation, resulting in uniform heating and minimized heat transfer time.

The present invention therefore relates to a heater having microchannels in which a plurality of thin metal plates having microchannels are layered, and a heating material and a material to be heated are supplied to a combustion thin plate and a heat transfer thin plate, respectively, to induce uniform mixing of fuel and air so as to minimize differences in reactor temperature. This uniformly produces heat required for heating from the entire surface of the reactor in which the material to be heated is present.

In order to accomplish the above object, one embodiment of the present invention provides a heater having microchannels for uniform heating, comprising an upper plate, including an inlet of material to be heated, a fuel inlet and an oxidant inlet. A lower plate includes a heated material outlet and an exhaust gas outlet. A plurality of combustion thin plates and a plurality of heat transfer thin plates, which are alternately layered between the upper plate and the lower plate. Each of the combustion thin plates and the heat transfer thin plates has an inlet hole of material to be heated, a heated material outlet hole, an oxidant hole, an exhaust gas hole, a fuel hole, and microchannels formed at respective corresponding positions.

The exhaust gas hole and the fuel hole of the combustion thin plate are connected by the microchannels. The inlet hole of material to be heated and the heated material outlet hole of the heat transfer thin plate are connected by the microchannels. The combustion thin plate has a fuel supply portion, which is linked with a fuel supply hole connected to the fuel hole of the heat transfer thin plate, to supply fuel thereto. The upper plate, and the combustion thin plate that is in contact with a lower surface of the upper plate are disposed such that the material at the inlet can be heated. The fuel inlet, and the oxidant inlet of the upper plate are aligned with the inlet hole of material to be heated, the fuel hole, and the oxidant hole of the combustion thin plate, respectively. The lower plate and the heat transfer thin plate in contact with an upper surface of the lower plate are disposed such that the heated material outlet and the exhaust gas outlet of the lower plate are aligned with the heated material outlet hole and the exhaust gas hole of the heat transfer thin plate, respectively.

The microchannels of the combustion thin plate can be coated with an oxidation catalyst. The microchannels of the heat transfer thin plate can be coated with a hydrocarbon reforming catalyst.

As mentioned earlier, the present invention provides a heater having microchannels for uniform heating. Since the combustion of hydrocarbon and/or oxidation may be uniformly conducted in the reactor, the temperature difference between different positions in the reactor is decreased, thus increasing heating efficiency.

Further, the heater of the present invention can be applied not only to a reaction system for the preparation of hydrogen through reforming of hydrocarbon, but also to a heating system or evaporating system using combustion heat.

In the heater of the present invention, an oxidation reaction can be conducted at a plurality of portions, thus suppressing the combustion of fuel at the inlet of the reactor. Therefore, this heater may have various applications, in addition to the above system.

In particular, the heater of the present invention is suitable for use in the combustion of hydrogen, which can explode when co-existing with oxygen, and in selective carbon monoxide oxidation (PrOx) as a hydrogen refining reaction able to exhibit high performance when oxygen is supplied through multiple steps.

Reference should now be made to the drawings, in which the same reference numerals are used throughout the different drawings to designate the same or similar components.

The following reference numerals are used throughout the drawings:

100: upper plate
110: inlet pipe of material to be heated
111: inlet of material to be heated
120: fuel inlet pipe
121: fuel inlet
130: oxidant inlet pipe
131: oxidant inlet
200: combustion thin plate
211, 311: inlet hole of material to be heated
221, 321: fuel hole
231, 331: oxidant hole
252, 352: exhaust gas hole
262, 362: heated material outlet hole
271: mixing groove
275: fuel supply hole
381: fuel supply induction groove
291, 391: microchannels
300: heat transfer thin plate
400: lower plate
450: exhaust gas outlet pipe
452: exhaust gas outlet
460: heated material outlet pipe
462: heated material outlet FIG. 1 is an exploded perspective view showing one embodiment of a heater of the present invention, which has a plurality of combustion thin plates 200 and a plurality of heat transfer thin plates 300 are alternately layered between an upper plate 100 and a lower plate 400, in order to maximize the contact area of a material to be heated and a heating medium.

The upper plate 100 is equipped with an inlet pipe 110 of material to be heated, a fuel inlet pipe 120, and an oxidant inlet pipe 130. The inlet pipe 110 of material to be heated 110, the fuel inlet pipe 120, and the oxidant inlet pipe 130 are provided on an upper surface of the upper plate 100.

The lower plate 400 is provided with a heated material outlet pipe 460 and an exhaust gas outlet pipe 450. The heated material outlet pipe 460 and the exhaust gas outlet pipe 450 are provided on a lower surface of the lower plate 400.

In the combustion thin plate 200 and the heat transfer thin plate 300, five holes and microchannels 291, 391 are formed at respective corresponding positions. That is, the inlet holes 211, 311 of material to be heated, the heated material outlet holes 262, 362, the oxidant holes 231, 331, the exhaust gas holes 252, 352, the fuel holes 221, 321, and the microchannels 291, 391 have respective corresponding sizes, shapes, and positions generally as illustrated in FIG. 1.

In the present invention, the inlet holes 211, 311 of material to be heated, the oxidant holes 231, 331, the heated material outlet holes 262, 362, and the exhaust gas holes 252, 352 are sequentially positioned to constitute four corners of the corresponding rectangular thin plates, and the microchannels 291, 391 are positioned at central portions thereof. In addition, the fuel holes 221, 321 are positioned between the inlet holes 211, 311 of material to be heated and the oxidant holes 231, 331.

The combustion thin plate 200 has grooves for use in the connection of the oxidant hole 231, the microchannels 291, and the exhaust gas hole 252 to each other. In particular, a fuel supply hole 275 is formed in a mixing groove 271 for the connection of the oxidant hole 231 and the microchannels 291.

The fuel supply hole 275 is linked with a fuel supply induction groove 381, as discussed below.

Thus, the inlet hole of material to be heated 211 is spaced apart from the heated material outlet hole 262.

The combustion thin plate 200 for use in the production of combustion heat of hydrocarbon is coated with at least one of Al, Ti, Si, and Zr, as a support of an oxidation catalyst, and a stabilizer, such as any of Ce, Co, La or Sn, as an additive adjuvant to increase both high temperature heat resistance and oxidizing power, dried, and then sintered, after which the outer surface of the coated thin plate 200 is additionally coated with at least one precious metal, having oxidizing power, such as Pt, Pd, Rh, and Ru, dried, sintered, and reduced, thereby completing the process of coating the plate 200 with the oxidation catalyst.

The oxidation catalyst application process includes supplying a coating solution into the oxidant inlet hole 131 of FIG. 1, and transferring the coating material to the corresponding thin plate using high-pressure air while preventing the microchannels from being clogged by the partially excess coating solution. As such, the excess coating solution is discharged through the exhaust gas outlet hole 452.

The heat transfer thin plate 300 has grooves for use in the connection of the inlet hole of material to be heated 311, the microchannels 391, and the heated material outlet hole 362. In particular, the fuel supply induction groove 381 connected to the fuel hole 321 is provided to be linked with the fuel supply hole 275.

Thus, the fuel may be supplied into the mixing groove 271 via the fuel hole 321, the fuel supply induction groove 381, and then the fuel supply hole 275. The oxidant hole 331 is spaced apart from the exhaust gas hole 352. The fuel supply hole 275 is formed to have a small diameter for easy diffusion of the fuel.

A flow path for heated material needs to be coated with a reforming catalyst to easily generate hydrogen. For example, steam reforming of methanol is described below. The methanol reforming catalyst is not particularly limited, and any catalyst known in the literature, such as Cu—Zn, Pd—Zn, Pt—Ce, etc., may be used. Preferably, a precious metal catalyst is used to assure thermal stability and oxygen stability.

The catalyst application process is the same as the combustion catalyst application process. The microchannel 291 is coated with the support material and then with active metal, dried, sintered, and reduced.

The coating material is supplied through the inlet hole 111 of material to be heated, compressed using a high-pressure gas to supply it to the corresponding thin plate and externally discharge the excess residue thereof through the heated material outlet hole 462.

As the four components of the heater the upper plate 100, the combustion thin plate 200, the heat transfer thin plate 300, and the lower plate 400 are layered in that order, the plurality of pairs of combustion thin plates 200 and heat transfer thin plates 300 also being layered.

As the number of pairs of thin plates 200, 300 to be layered is increased, uniform heating is more easily realized, but limitations are imposed on the design thereof. Hence, the number of plates 200, 300 is controlled depending on the required conditions.

In particular, the inlet 111 of material to be heated, the fuel inlet 121, and the oxidant inlet 131 of the upper plate 100 are aligned with the inlet hole 211 of material to be heated, the fuel hole 221, and the oxidant inlet 231, respectively, of the combustion thin plate 200 provided to contact the lower surface of the upper plate 100.

Therefore, the upper portions of the heated material outlet hole 252 and the exhaust gas hole 262 of the combustion thin plate 200 in contact with the lower surface of the upper plate 100 are closed.

Further, the heated material outlet 462 and the exhaust gas outlet 452 of the lower plate 400 are aligned with the heated material outlet hole 362 and the exhaust gas hole 352, respectively, of the heat transfer thin plate 300 provided to contact the upper surface of the lower plate 400.

Hence, the lower portions of the inlet hole 311 of material to be heated, the fuel hole 321, and the oxidant inlet hole 331 of the heat transfer thin plate 300 in contact with the upper surface of the lower plate 400 are closed.

In this manner, when the process of assembling the heater is completed, the five holes in the plurality of pairs of the combustion thin plates 200 and the heat transfer thin plates 300 function as long pipes.

That is, the plurality of pairs of inlet holes of material to be heated 211, 311, of heated material outlet holes 262, 362, of oxidant holes 231, 331, of exhaust gas holes 252, 352, and of fuel holes 221, 321 are layered to form respective pipes. In this case, the inlet holes of material to be heated 211, 311, the oxidant holes 231, 331, and the fuel holes 221, 321 are provided in bottom-closed pipe form, whereas the heated material outlet holes 262, 362 and the exhaust gas holes 252, 352 are provided in top-closed pipe form.

The upper plate 100, the combustion thin plate 200, the heat transfer thin plate 300, and the lower plate 400 should be in contact with each other so as to prevent gas from escaping. To this end, it is preferred that the contact surfaces of the plates 100, 200, 300, 400 be very finely processed and the layered side surfaces thereof be sealed using a sealing agent.

In addition, although the combustion thin plate 200 and heat transfer thin plate 300 may be inversely positioned, the oxidation reaction should be conducted on the corresponding thin plate.

The thickness of the combustion thin plate 200 and heat transfer thin plate 300 is not limited.

However, the thickness of the heat transfer thin plate 300 should be determined in consideration of the width and depth of the microchannels in order to assure a large surface area in the same volume.

Further, the thickness of the thin plate needs to be determined depending on the type of reaction occurring thereon. For example, upon a methanol wet reforming reaction being less endothermic, the thin plate may be formed to have a thickness of 1~5 mm in order to use a particle catalyst instead of coating the thin plate with a catalyst.

Also, the thin plate for use in the combustion of hydrocarbon is preferably formed to have a thickness of 0.1~1.0 mm and then coated with an oxidation catalyst, to complete a desired heating system. Regardless of the case, however, pipes for separately supplying hydrocarbon, hydrogen, or carbon monoxide, serving as fuel, and oxygen of the oxidant must be provided such that the mixing portion for mixing the above reaction materials is positioned in the thin plate coated with the combustion catalyst. As such, the thin plates can be connected using brazing, diffusion, screws or bolts.

The operation of the heater is described below.

The heater described herein includes the upper plate 100, the lower plate 400, the combustion thin plate 200, and the heat transfer thin plate 300, by which a heated material flow path for supplying and heating a material to be heated and then discharging a heated material, a fuel flow path for supplying fuel, and a combustion flow path for supplying an oxidant to conduct the combustion of fuel supplied from the fuel flow path and then discharging an exhaust gas are formed.

In the present invention, the fuel flow path and the combustion flow path are separately provided in order to mix the fuel with the oxidant in the system.

If the fuel and the oxidant are mixed outside of the system and then supplied therein, the temperature of the gas mixture inlet is increased, and therefore, a heating reaction is caused at the above inlet which is spaced apart from the position where the endothermic reaction of the material to be heated occurs.

Further, when the heating reaction is caused at the inlet, thermal deformation of the system may occur.

Thus, with the goal of overcoming the non-uniform temperature in the system of the present invention, the system should be structured such that the combustion heat is used for an endothermic reaction immediately upon its production thereof.

The heated material flow path sequentially comprises the inlet 111 of material to be heated, the inlet hole 311 of material to be heated, the microchannels 391, the heated material outlet hole 362 of the heat transfer thin plate 300, and the heated material outlet 462.

The combustion flow path sequentially comprises the oxidant inlet 131, the oxidant hole 231, the microchannels 291, the exhaust gas hole 252 of the combustion thin plate 200, and the exhaust gas outlet 452.

Finally, the fuel flow path sequentially comprises the fuel inlet 121, the fuel hole 321, the fuel supply induction groove 381, and the fuel supply hole 275. The fuel is mixed with the oxidant in the mixing groove 271.

Therefore, $CH_4$, water vapor and/or air are supplied into the inlet 111 of material to be heated, while hydrocarbon fuel ($CH_4$, LNG, vaporizing gasoline, vaporizing light oil), alcohol, carbon monoxide and hydrogen are supplied alone or in combinations thereof into the fuel inlet 121. Further, air or high concentration oxygen-containing air is supplied into the oxidant inlet 131.

The water vapor or air supplied into the inlet 111 of material to be heated functions as a cooling medium for preventing over-heating of the material to be heated.

The supplied fuel reaches the mixing groove 271 through the fuel flow path and is then mixed with the oxidant, which is supplied through the oxidant inlet 131, in the mixing groove 271. The mixture is supplied into the microchannels 291 to initiate the combustion reaction.

Although the oxidation reaction is mainly conducted in the microchannels 291, it can also occur in the mixing groove 271, which is heated over time.

The reaction heat produced from the combustion thin plate 200 through the oxidation reaction functions to heat the heat transfer thin plates 300 positioned on the upper and lower surfaces of the combustion thin plate 200. In particular, the heat is used as reaction heat for the material to be heated, which is supplied into the microchannels 391 of the heated material flow path.

The gas (carbon dioxide, water, nitrogen) produced by the combustion reaction is discharged externally through the microchannels 291, the exhaust gas holes 252, 352, and then the exhaust gas outlet 452 of the lower plate 400.

The material to be heated is supplied into the system via the inlet 111 of material to be heated, passes through the inlet holes 211, 311 of material to be heated, and is then heated in the microchannels 391, after which the heated material is externally discharged through the heated material outlet hole 362 and then the heated material outlet 462 of the lower plate 400.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

The invention claimed is:

1. A heater having microchannels, comprising:
   an upper plate including an inlet of material to be heated, a fuel inlet and an oxidant inlet;
   a lower plate including a heated material outlet and an exhaust gas outlet;
   a plurality of combustion plates; and
   a plurality of heat transfer plates,
   wherein the combustion plates and the heat transfer plates are alternately layered between the upper plate and the lower plate,
   wherein each of the combustion plates and each of the heat transfer plates has an inlet hole of the material to be heated, a heated material outlet hole, an oxidant hole, an exhaust gas hole, and a fuel hole,
   wherein the exhaust gas hole and the fuel hole of the combustion plate are connected by a first plurality of microchannels,
   wherein the inlet hole of material to be heated and the heated material outlet hole of the heat transfer plate are connected by a second plurality of microchannels,
   wherein the combustion plate further has a fuel supply portion, which is linked with a fuel supply hole connected to the fuel hole of the heat transfer plate, to supply fuel thereto,
   wherein the upper plate and a combustion plate, of the plurality of combustion plates, which is in contact with a lower surface of the upper plate, are disposed such that the inlet of material to be heated, the fuel inlet, and the oxidant inlet of the upper plate are aligned with the inlet hole of material to be heated, the fuel hole, and the oxidant hole of the combustion plate, respectively, and wherein the lower plate and a heat transfer plate, of the plurality of heat transfer plates, which is in contact with an upper surface of the lower plate, are disposed such that the heated material outlet and the exhaust gas outlet of the lower plate are aligned with the heated material outlet hole and the exhaust gas hole of the heat transfer plate, respectively, and wherein the microchannels of the combustion plates are coated with an oxidation catalyst.

2. A heater having microchannels, comprising:

an upper plate including an inlet of material to be heated, a fuel inlet and an oxidant inlet;

a lower plate including a heated material outlet and an exhaust gas outlet;

a plurality of combustion plates; and a plurality of heat transfer plates, wherein the combustion plates and the heat transfer plates are alternately layered between the upper plate and the lower plate, wherein each of the combustion plates and each of the heat transfer plates has an inlet hole of the material to be heated, a heated material outlet hole, an oxidant hole, an exhaust gas hole, and a fuel hole, wherein the exhaust gas hole and the fuel hole of the combustion plate are connected by a first plurality of microchannels, wherein the inlet hole of material to be heated and the heated material outlet hole of the heat transfer plate are connected by a second plurality of microchannels, wherein the combustion plate further has a fuel supply portion, which is linked with a fuel supply hole connected to the fuel hole of the heat transfer plate, to supply fuel thereto, wherein the upper plate and a combustion plate, of the plurality of combustion plates, which is in contact with a lower surface of the upper plate, are disposed such that the inlet of material to be heated, the fuel inlet, and the oxidant inlet of the upper plate are aligned with the inlet hole of material to be heated, the fuel hole, and the oxidant hole of the combustion plate, respectively, and wherein the lower plate and a heat transfer plate, of the plurality of heat transfer plates, which is in contact with an upper surface of the lower plate, are disposed such that the heated material outlet and the exhaust gas outlet of the lower plate are aligned with the heated material outlet hole and the exhaust gas hole of the heat transfer plate, respectively, and wherein the microchannels of the heat transfer plates are coated with a hydrocarbon reforming catalyst.

3. A heater comprising:

an upper plate including an inlet for material to be heated, a fuel inlet and an oxidant inlet;

a lower plate including a heated material outlet and an exhaust gas outlet;

a plurality of combustion plates;

a plurality of heat transfer plates, wherein the combustion plates and the heat transfer plates are alternately layered between the upper plate and the lower plate, wherein each of the combustion plates and each of the heat transfer plates has an inlet hole of the material to be heated, a heated material outlet hole, an oxidant hole, an exhaust gas hole, and a fuel hole;

a first plurality of microchannels connecting the exhaust gas hole and the fuel hole of the combustion plate;

a second plurality of microchannels connecting the inlet hole of material to be heated and the heated material outlet hole of the heat transfer plate; and the combustion plate further comprising a fuel supply hole connected to a fuel hole of an adjacent heat transfer plate, wherein the inlet of material to be heated, the fuel inlet, and the oxidant inlet of the upper plate are aligned with the inlet hole of material to be heated, the fuel hole, and the oxidant hole of one of the combustion plates that is in contact with the upper plate, and wherein the heated material outlet and the exhaust gas outlet of the lower plate are aligned with the heated material outlet hole and the exhaust gas hole of one of the heat transfer plates that is adjacent to the lower plate, and wherein the microchannels of the combustion plates are coated with an oxidation catalyst.

4. The heater according to claim 3, wherein the oxidation catalyst is any of Al, Ti, Si, and Zr.

5. The heater according to claim 3, wherein the oxidation catalyst is selected from the group consisting of Al, Ti, Si, and Zr.

6. A heater comprising:

an upper plate including an inlet for material to be heated, a fuel inlet and an oxidant inlet;

a lower plate including a heated material outlet and an exhaust gas outlet;

a plurality of combustion plates;

a plurality of heat transfer plates, wherein the combustion plates and the heat transfer plates are alternately layered between the upper plate and the lower plate, wherein each of the combustion plates and each of the heat transfer plates has an inlet hole of the material to be heated, a heated material outlet hole, an oxidant hole, an exhaust gas hole, and a fuel hole;

a first plurality of microchannels connecting the exhaust gas hole and the fuel hole of the combustion plate;

a second plurality of microchannels connecting the inlet hole of material to be heated and the heated material outlet hole of the heat transfer plate; and the combustion plate further comprising a fuel supply hole connected to a fuel hole of an adjacent heat transfer plate, wherein the inlet of material to be heated, the fuel inlet, and the oxidant inlet of the upper plate are aligned with the inlet hole of material to be heated, the fuel hole, and the oxidant hole of one of the combustion plates that is in contact with the upper plate, and wherein the heated material outlet and the exhaust gas outlet of the lower plate are aligned with the heated material outlet hole and the exhaust gas hole of one of the heat transfer plates that is adjacent to the lower plate, and wherein the microchannels of the combustion plates are coated with any of Ce, Co, La or Sn.

7. A heater comprising:

an upper plate including an inlet for material to be heated, a fuel inlet and an oxidant inlet;

a lower plate including a heated material outlet and an exhaust gas outlet;

a plurality of combustion plates;

a plurality of heat transfer plates, wherein the combustion plates and the heat transfer plates are alternately layered between the upper plate and the lower plate, wherein each of the combustion plates and each of the heat transfer plates has an inlet hole of the material to be heated, a heated material outlet hole, an oxidant hole, an exhaust gas hole, and a fuel hole;

a first plurality of microchannels connecting the exhaust gas hole and the fuel hole of the combustion plate;

a second plurality of microchannels connecting the inlet hole of material to be heated and the heated material outlet hole of the heat transfer plate; and the combustion plate further comprising a fuel supply hole connected to a fuel hole of an adjacent heat transfer plate, wherein the inlet of material to be heated, the fuel inlet, and the oxidant inlet of the upper plate are aligned with the inlet hole of material to be heated, the fuel hole, and the oxidant hole of one of the combustion plates that is in contact with the upper plate, and wherein the heated material outlet and the exhaust gas outlet of the lower plate are aligned with the heated material outlet hole and the exhaust gas hole of one of the heat transfer plates that is adjacent to the lower plate, and wherein an outer surface of each combustion plate is coated with any of Pt, Pd, Rh, and Ru.

8. A heater comprising:

an upper plate including an inlet for material to be heated, a fuel inlet and an oxidant inlet;

a lower plate including a heated material outlet and an exhaust gas outlet;

a plurality of combustion plates;

a plurality of heat transfer plates, wherein the combustion plates and the heat transfer plates are alternately layered between the upper plate and the lower plate, wherein each of the combustion plates and each of the heat transfer plates has an inlet hole of the material to be heated, a heated material outlet hole, an oxidant hole, an exhaust gas hole, and a fuel hole;

a first plurality of microchannels connecting the exhaust gas hole and the fuel hole of the combustion plate;

a second plurality of microchannels connecting the inlet hole of material to be heated and the heated material outlet hole of the heat transfer plate; and the combustion plate further comprising a fuel supply hole connected to a fuel hole of an adjacent heat transfer plate, wherein the inlet of material to be heated, the fuel inlet, and the oxidant inlet of the upper plate are aligned with the inlet hole of material to be heated, the fuel hole, and the oxidant hole of one of the combustion plates that is in contact with the upper plate, and wherein the heated material outlet and the exhaust gas outlet of the lower plate are aligned with the heated material outlet hole and the exhaust gas hole of one of the heat transfer plates that is adjacent to the lower plate, and wherein the microchannels of the heat transfer plates are coated with a hydrocarbon reforming catalyst.

9. The heater according to claim 8, wherein the hydrocarbon reforming catalyst includes a precious metal.

* * * * *